United States Patent
Ashwood-Smith

(10) Patent No.: US 7,920,487 B2
(45) Date of Patent: Apr. 5, 2011

(54) METHOD AND APPARATUS FOR LOOP PREVENTION IN COMMUNICATION NETWORKS

(75) Inventor: Peter Ashwood-Smith, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 74 days.

(21) Appl. No.: 12/175,881

(22) Filed: Jul. 18, 2008

(65) Prior Publication Data

US 2010/0014442 A1     Jan. 21, 2010

(51) Int. Cl.
    *H04L 12/28* (2006.01)
(52) U.S. Cl. ............... 370/255; 370/256; 370/395.53
(58) Field of Classification Search .......... 370/254, 370/255, 256, 395.53
    See application file for complete search history.

(56) References Cited

U.S. PATENT DOCUMENTS

| | | | |
|---|---|---|---|
| 6,035,105 A * | 3/2000 | McCloghrie et al. | 709/236 |
| 7,042,837 B1 * | 5/2006 | Cassiday et al. | 370/225 |
| 7,292,581 B2 * | 11/2007 | Finn | 370/395.53 |
| 7,386,628 B1 * | 6/2008 | Hansell et al. | 709/238 |
| 7,701,881 B1 * | 4/2010 | Sankaran | 370/256 |
| 7,729,296 B1 * | 6/2010 | Choudhary | 370/256 |
| 7,733,804 B2 * | 6/2010 | Hardjono et al. | 370/254 |
| 2006/0013143 A1 | 1/2006 | Yasuie et al. | |
| 2006/0215583 A1 | 9/2006 | Castagnoli | |
| 2006/0221813 A1 | 10/2006 | Scudder et al. | |
| 2007/0286093 A1 | 12/2007 | Cai et al. | |

OTHER PUBLICATIONS

International Search Report and Written Opinion dated Oct. 5, 2009 for International Application No. PCT/CA2009/000875, International Filing Date Jun. 25, 2009 consisting of 11-pages.

* cited by examiner

*Primary Examiner* — Dang T Ton
*Assistant Examiner* — Brian O'Connor
(74) *Attorney, Agent, or Firm* — Christopher & Weisberg, P.A.

(57) ABSTRACT

A method and apparatus route data packets in communication network. A current routing topology of the network is analyzed and a digest value representing the current routing topology is determined. The digest value is encapsulated within the data packet. The data packet is forwarded according to the current routing topology.

18 Claims, 4 Drawing Sheets

METHOD AND APPARATUS FOR LOOP PREVENTION IN COMMUNICATION NETWORKS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and apparatus for routing data packets in a communication network, and more specifically, to a method and apparatus for preventing looping in a per-hop forwarded communication network using an encoded digest of the network topology against which the original routes were produced.

BACKGROUND OF THE INVENTION

In a distributed communication network, the time at which each individual component, such as nodes, access points, and routers, acts upon a common event is not synchronous. One of the biggest problems with data routing in a distributed network is that not all nodes have the same view of the network at the same time. There is an inherent delay involved in distributing notification of an event throughout the entire network. Examples of events which may cause time delays include network failure, deliberate changes in the network structure, and basic laws of physics.

At any given time, each node in a network is aware of the status of all other active nodes. Whenever data is available for distribution, each node determines a route for forwarding data through the network based on that node's perception of the present condition of the network. A number of factors determine the route chosen by the node, including which nodes and links are active, link utilization, the traffic flow/distribution requirements, etc. Ideally, if all the nodes have the same view of the network, at any given instant, each node would choose to route the data according to the same paths through the network.

In reality, delays within the system often cause the nodes to have different views of the network, resulting in the nodes choosing different i.e., non-optimal, paths for routing a particular set of data. Any time differences result in poor quality or incorrect routes, with the worst case being looped traffic. A routing loop may form when individual nodes compute the path's next hop base on differing network topology views. In a classic example, as shown in FIG. 1, for a network having three nodes (A, B, and C), node A transmits data to node C through node B. If the link between nodes B and C is broken, but node A has not yet learned of the breakage, node A transmits the data to node B assuming that the link A-B-C is the optimal route. Node B knows of the broken link and tries to reach node C via node A, thus sending the original data back to node A. Furthermore, node A receives the data that it originated back from node B and consults its routing table. Node A's routing table will say that it can reach node C via node B (because it still has not been informed of the break) thus sending its data back to node B creating an infinite loop. Routing loops unnecessarily tie up network resources and available bandwidth that would otherwise be free to route traffic.

For multicast traffic, route looping can be catastrophic. Using multicast, a source only has to send a packet once, even if the packet is to be delivered to a large number of receivers by following a tree like structure rooted at the origin. The nodes in the network replicate the packet as necessary to reach multiple receivers. A looping multicast packet continuously generates copies at it loops, which in turn generate additional copies. In the worst case, when looping occurs in this situation, thousands or even millions of copies of the same data packets can be continuously bounced around between nodes until the entire system is completely saturated and is unusable for actually routing other data traffic.

To combat the above-mentioned problems, a network will sometimes be configured to deliberately react slowly, or will require that the flow of certain traffic be disabled while the network "converges." At the control level, the only remedies or preventative measures currently in place include trying to process messages as fast as possible, attempting to reduce packetization delay for control packets, etc. One "band-aid fix" for the looping problem is to insert a "time to live" ("TTL") factor in data packets, which limits the amount of time or number of iterations or that a data packet can experience before it is discarded. Because the TTL value is decremented once per hop, network designers set the TTL relatively so that the packet reaches its destination before the TTL value reaches zero and is discarded. However, the TTL value does not prevent looping or incorrect routing; it only minimizes the damage experienced by the network when these events occur. Also, not every protocol has a TTL field. For example, Ethernet frames do not include a TTL value.

Some protocols may disable multicast traffic for some given time period, in particular immediately following a topology change, to wait for the network to converge. This approach is a "safe" mechanism chosen by spanning tree protocols used by Ethernet, but the traffic is turned off considerably longer than necessary (e.g., seconds). In effect, this remedy discourages multicast traffic because it either prevents the broadcasting of multicast traffic at unpredicted times or creates a backlog of messages to be delivered when the restriction is lifted.

In addition, Reverse Path Forwarding Checks ("RPFC") may be used to prevent loops by ensuring that the path back to the source of the packet is consistent with the interface where the packet arrived. Basically, RPFC causes the receiving node to look backwards to where the packet came from to verify that the source node of the packet is reachable from the present node via that particular interface, i.e., it checks the reverse path of the packet. If the check passes, the packet is forwarded on towards its destination node, otherwise, the packet is dropped. However, this approach requires a reverse path forwarding table in the routing hardware, which uses memory and consumes backplane transmission time. Additionally, RPFC does not guarantee 100% results and there are still rare cases where looping is possible. In particular, this approach is exceptionally susceptible to "headless" router operation where the router control plane can "die" while forwarding is still permitted. Headless operation is highly desirable for networking equipment and cannot be simply disallowed.

Therefore, what is needed is a method and apparatus for routing packets in a distributed communication network which allows for the efficient and effective routing of packets through the network with minimal probability of looping.

SUMMARY OF THE INVENTION

The present invention advantageously provides a method and apparatus for routing data packets in a communication network. Generally, the present invention advantageously provides a method of determining a routing topology of the network at the time a data packet is originated and including a digest value summarizing that original routing topology and included within the actual data packet. As long as the routing topology remains the compatible, the digest value included in the packet will match a locally computed digest and the data packet will be forwarded through the network. Mismatches or incompatibility between the local digest and the packet topology digest results in the packet being discarded.

One aspect of the present invention provides a method for routing data packets in communication network. A current routing topology of the network is analyzed and a digest value representing that current routing topology is determined. The digest value is encapsulated within the data packet. The data packet is forwarded according to the current routing topology.

In accordance with another aspect of the present invention, another method is provided for routing data packets in a communication network. A data packet for re-transmission is received. The data packet includes a first digest value which summarizes a routing topology of the network at a time the data packet was first forwarded by a node implementing this method/apparatus. The current routing topology of the network is computed and second digest value representing the current routing topology is determined. The first digest value is compared to the second digest value. If the first digest value and the second digest value are the same, the data packet is forwarded.

In accordance with yet another aspect, an apparatus is provided for routing data packets in a communication network. The apparatus includes a controller and a communication interface. The communication interface is communicatively coupled to the controller. The controller is operable to analyze a routing topology of the network, determine a first digest value representing the routing topology, and encapsulate the digest value in the data packet. The communication interface is operable to forward the data packet according to the routing topology.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
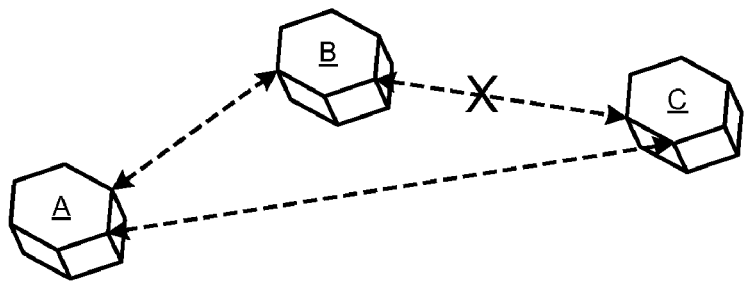
FIG. 1 is a block diagram of a prior art communication network.

Before describing in detail exemplary embodiments that are in accordance with the present invention, it is noted that the embodiments reside primarily in combinations of apparatus components and processing steps related to implementing a system and method for routing packets in a distributed communication network where a digest of the topology used by the originating node to compute the forwarding path of a packet is encoded within the packet. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Additionally, as used herein and in the appended claims, the term "Zigbee" relates to a suite of high-level wireless communication protocols as defined by the Institute of Electrical and Electronics Engineers ("IEEE") standard 802.15.4. Further, "Wi-Fi" refers to the communications standard defined by IEEE 802.11. The term "WiMAX" means the communication protocols defined under IEEE 802.16. "BLUETOOTH" refers to the industrial specification for wireless personal area network ("PAN") communication developed by the Bluetooth Special Interest Group.

One embodiment of the present invention advantageously provides a method and system for preventing looping in a hop-by-hop forwarded network by using packet to topology instance correlation. When a topology change occurs, a digest of that change is computed such that all nodes with the same topology view compute the same digest. Any packet launched into network topology is marked with the digest value computed by the node inserting the packet. Tandem or transit nodes compare the digest value with their current digest value and discard any packet containing a mismatched digest value. In addition to checking and possibly discarding the packet based on the digest value, nodes at the egress of the topology may strip the digest from the packet so that it may continue being forwarded by nodes that do not implement this apparatus.

One embodiment of the present invention significantly reduces, or completely eliminates the probability of packet looping or a packet following an incorrect path as the packet itself "knows" the route that it is following. The presence of any inconsistency in end-to-end topology views simply result in the packet being discarded with absolutely no chance of looping. Since the exact time of a topology change cannot be guaranteed, embodiments of the present invention do the "next best thing" and provide a high probability guarantee of a topology "instance."

The present invention may be implemented in networks that use internal or external routing protocols, such as Open Shortest Path First ("OSPF"), Border Gateway Protocol ("BGP"), Interior Gateway Protocol ("IGP"), Intermediate system to intermediate system ("IS-IS"), etc.

Figure 2:
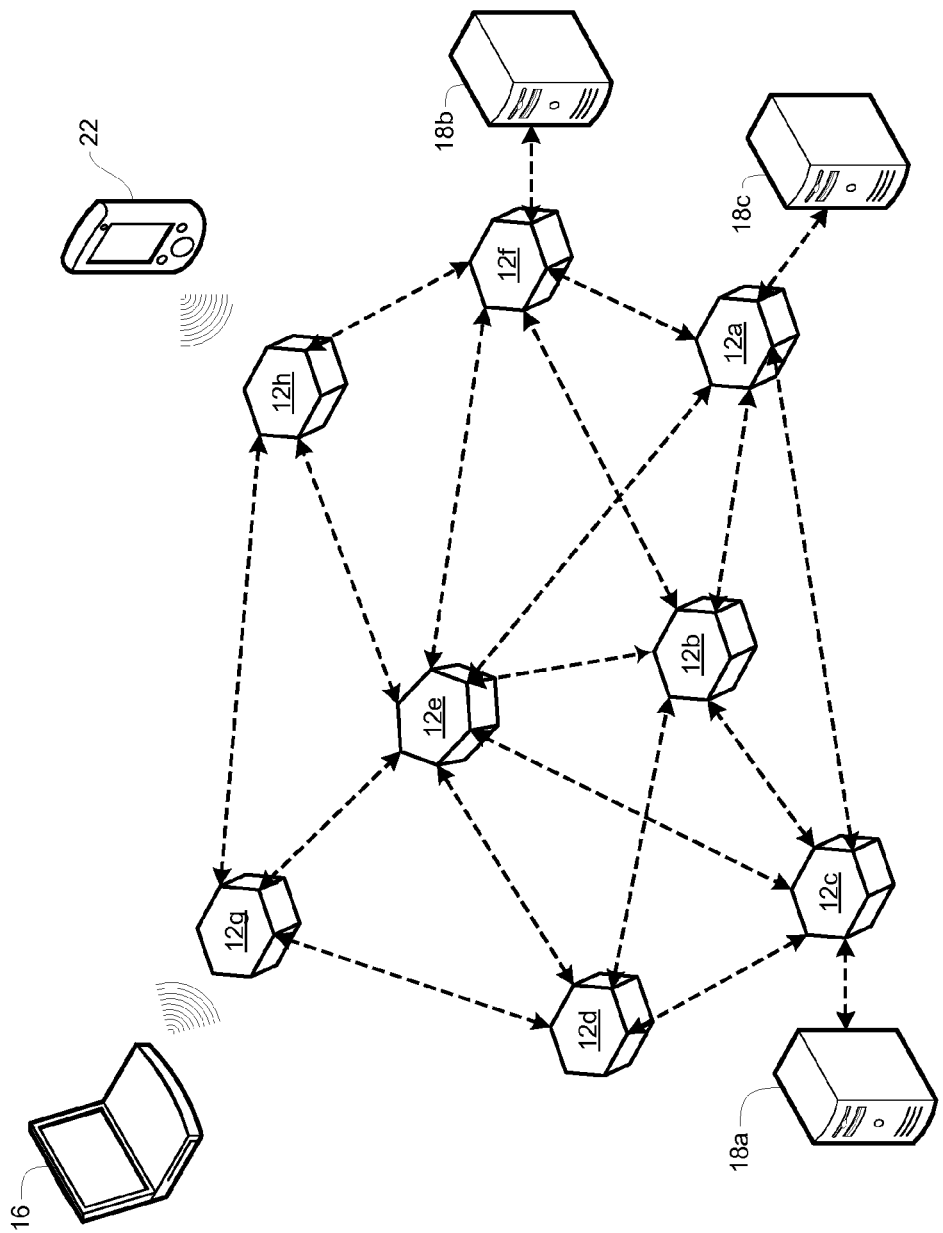
FIG. 2 is a block diagram of a distributed communication network constructed in accordance with the principles of the present invention.

Referring now to the drawing figures in which like reference designators refer to like elements, there is shown in FIG. 2 a distributed communication network 10 for preventing looping by using packet to topology instance correlation. Network 10 includes an array of nodes 12*a*, 12*b*, 12*c*, 12*d*, 12*e*, 12*f*, 12*g* and 12*h* (referred to collectively as nodes 12). The nodes 12 may include wireless access points, hubs, routers, switches, gateways, or any other device commonly known to forward data packets in a communication network. Each node 12 may originate data packets and/or forward received data packets on to other nodes 12 and/or client devices in the network 10. The network 10 also may include a plurality of client devices, such as a portable data assistant ("PDA") 14, a laptop computer 16, and a desktop computer 18*a*, 18*b*, 18*c* (three shown). Each node 12 may be hard-wired to neighboring nodes 12 and/or client devices and routes data packets between client devices using any combination of commonly used wired and/or wireless communication protocols such as Transmission Control Protocol/Internet Protocol ("TCP/IP"), Ethernet, etc. Additionally, each node 12 may communicate with neighboring nodes 12 and/or client devices using radio frequency ("RF") signals encoded according to standard communication protocols, such Wi-Fi, WiMAX, Zigbee, BLUETOOTH, etc.

Communication network 10 may be a wide-area network such as the Internet, intranet, or other communication network, including but not limited to a personal area networks ("PAN"), local area networks ("LAN"), campus area networks ("CAN"), metropolitan area networks ("MAN"), etc. It should be noted that network 10 may include any number of client computers devices and network nodes 12. The amount and type of client devices and nodes 12 shown in FIG. 2 is for illustrative purposes only and does not limit the scope of the present invention.

Figure 3:
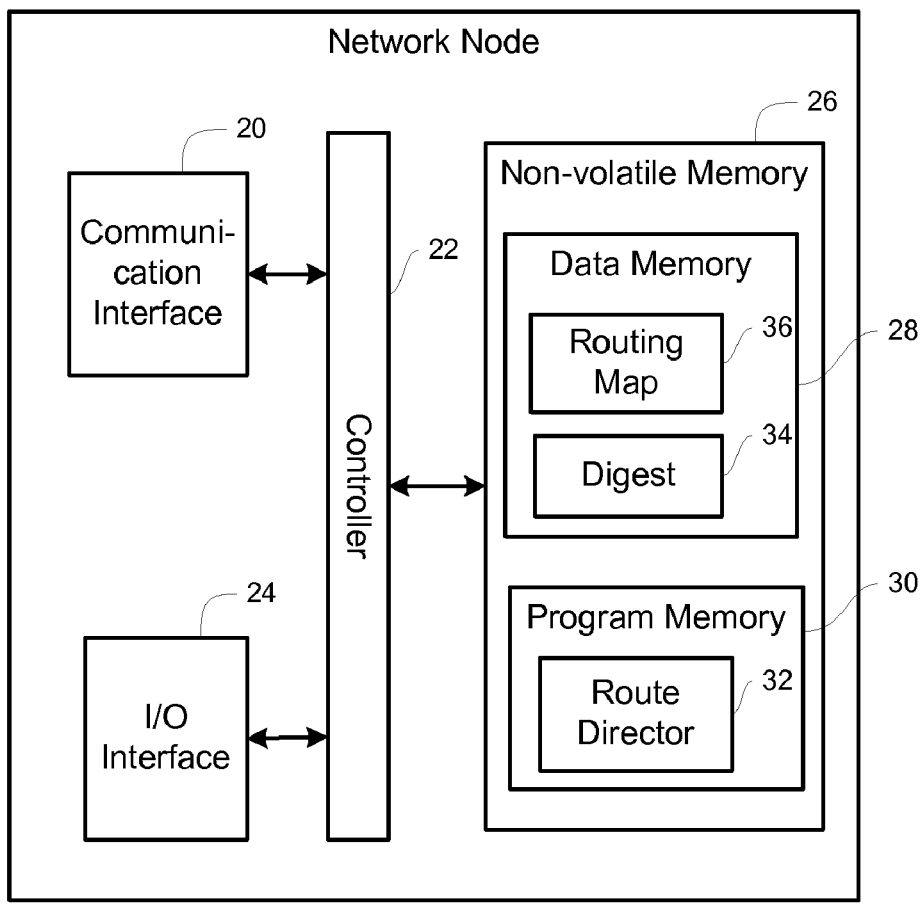
FIG. 3 is a block diagram of a configuration manager constructed in accordance with the principles of the present invention.

Referring now to FIG. 3, an exemplary node 12 includes a communication interface 20 communicatively coupled to a controller 22. The communication interface 20 may be wired, wireless, or any combination thereof. The communication interface 20 transfers data packets between the network nodes 12 and the client devices 18 using known communication protocols, e.g., Ethernet, Wi-Fi, etc. The controller 22 controls the processing of information and the operation of the network node 20 in a well-known manner. The controller 22 is also coupled to an input/output interface 24 and a non-volatile memory 26. The input/output interface 24 controls the reception and presentation of information to and from a user through various well-known peripheral devices such as a display screen, a keyboard, a mouse, a printer, a web browser, etc.

The non-volatile memory 26 includes a data memory 28 and a program memory 30. Examples of non-volatile memory include, but are not limited to, a hard drive, a memory stick, an Electrically Erasable Programmable Read-Only Memory ("EEPROM"), a flash memory, etc. Additionally, instead of or in addition to non-volatile memory, the data memory 28 may be included as some form of volatile memory, e.g., RAM. The program memory 30 contains a route director 32 which determines the routing topology of the communication network 10, creates a digest value 34 to identify the routing topology, and verifies that each packet being routed originated using the present routing topology. The operation of the route director 32 is discussed in more detail below. The data memory 28 stores data files such as a routing map 36 which is created by the route director 32 and contains the present routing topology for the network 10, the digest value 34 and various other user data files (not shown). The digest value 34 may be a numeric, alphanumeric, or other identifier, such as a hash value, which identifies the components of the routing topology. Although the method and apparatus of the present invention do not depend on the length of the digest, longer digests result in lower probabilities of looping.

Figure 4:
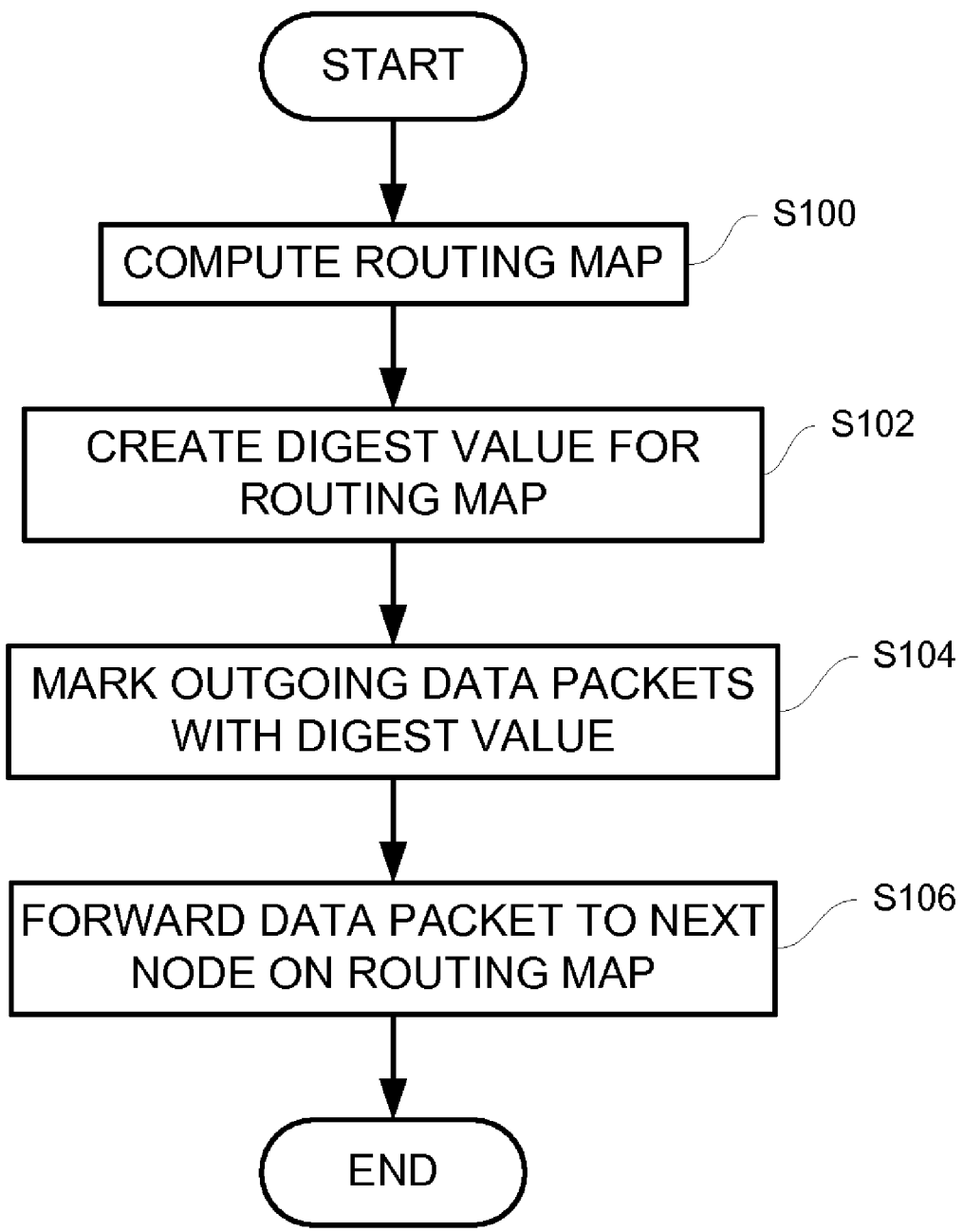
FIG. 4 is a flowchart of an exemplary digest encryption process according to the principles of the present invention.

Referring now to FIG. 4, an exemplary operational flowchart is provided that describes steps performed by a route director 32 of an originating node 12 for encrypting a digest value 34 identifying the route topology of the network 10 at the time a data packet originates and encapsulating the digest value 34 into the actual packet content. The route director 32 computes a routing map 36 of the present network topology (step S100) using a consistent network-wide algorithm. The routing map may be computed using a Dijkstra shortest path algorithm, commonly referred to as Shortest Path First ("SPF") routing. The input to this well known algorithm is the network topology, i.e., nodes and links, and the addresses of attached devices or addresses reachable by those nodes. The output consists of a next hop to take to reach each of the addresses. The term "routing map," as used herein, includes not only the output of the SPF computation but also the inputs.

A simple digest value 34 is created for the routing map 36 (step S102) using, for example, a hash function. The digest value 34 may include a hash or digest of all information that the network administrator, designer, or other authorized coordinator determines to be pertinent. For example, the digest value 34 may identify important information relating to the network, including but not limited to node identifiers, links between nodes, costs associated with traversing each link (e.g., weight values), etc. One exemplary method for calculating the digest value 34 is simply to sum all the node and link identifiers for each active node 12 and link in the network 10 and apply a modulus function, such as a modulo 1024.

An outgoing data packet is marked with the resultant digest value 34 (step S104). The digest value 34 may either be directly encoded into a packet header, or may be mapped into the packet header. The marked data packet is forwarded to the next network node 12 in the routing map 36 (step S106).

Figure 5:
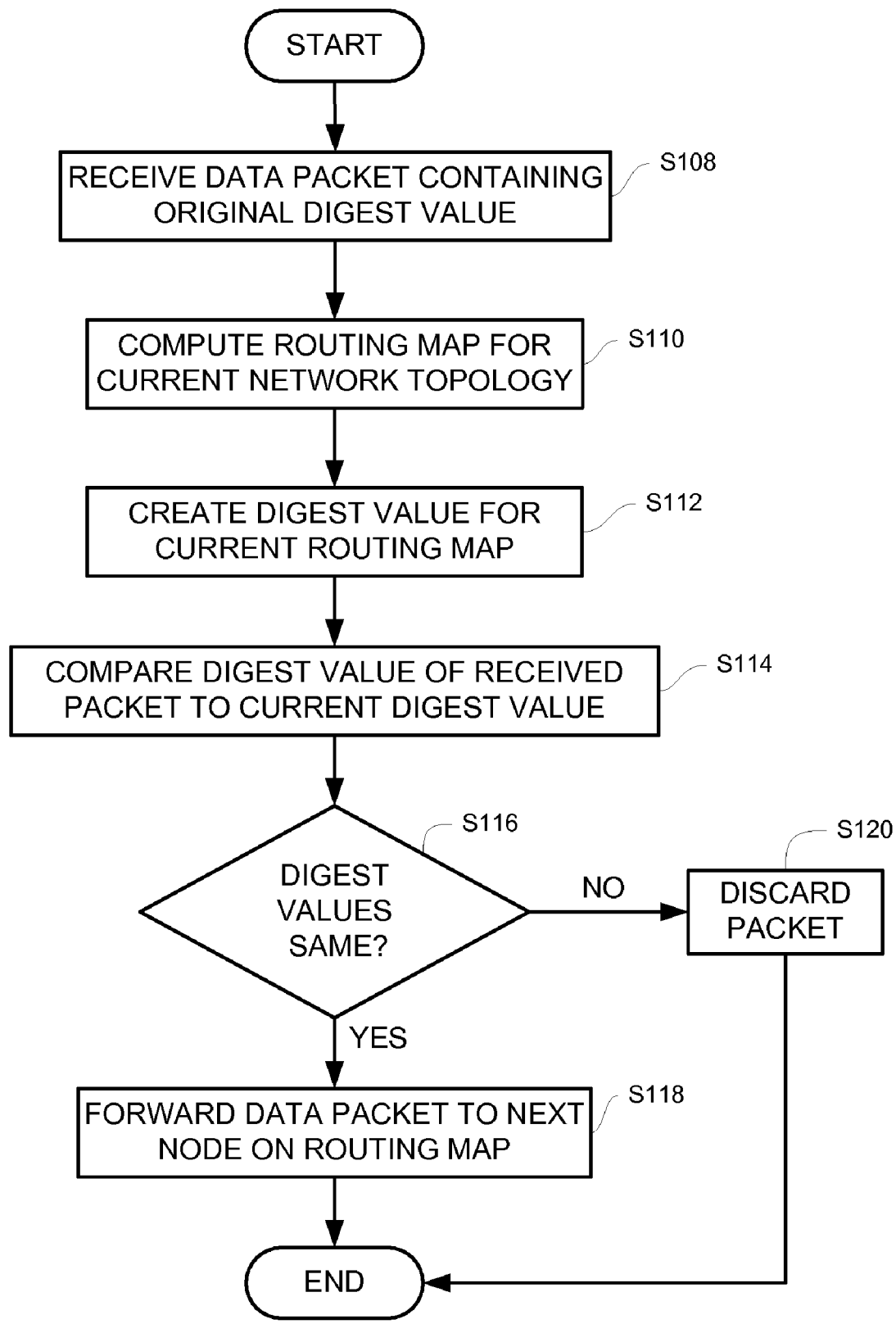
FIG. 5 is a flowchart of an exemplary digest verification process according to the principles of the present invention.

FIG. 5 provides an exemplary operational flowchart that describes steps performed by a route director 32 of a transit/tandem node for forwarding a data packet which includes a digest value 34 of a routing map 36 for network topology calculated from the perspective of an originating node at the time the data packet was originally forwarded. The transit/tandem node receives a data packet containing an embedded or mapped digest value summarizing the topology configuration of the network at the time the packet was created or originated (step S108). The route director 32 of the transit/tandem node computes a current routing map 36 that reflects the present configuration of the network topology (step S110). The route director 32 computes a routing map 36 of the present network topology (step S112) using the same algorithm that the originating node previously used. The route director 32 compares the new digest value to the digest value contained or otherwise indicated in the received data packet (step S114). If the digest values are the same (step S116), then no topology changes have occurred since the data packet was originally forwarded and the route director 32 forwards the data packet to the next node on the route map. However, if the digest values 34 are not the same (step S116), the data packet is discarded (step S120). Since packets are only able to flow along an end-to-end path that is consistent for the instance of topology at the time they were launched, looping is impossible. Note that FIG. 5 shows that the steps S110 and S112 follow receipt of a packet; however, it should be clear to those familiar with the art that these steps may be performed once on a topology change and the results used on every packet receipt.

An exemplary embodiment of the present invention may summarize an IS-IS/OSPF topology database by XORing all of the link specific data in the database. Thus, two databases that contain the same "graph" of the network 10 will have the same resulting digest values 34. If two databases are different, they will very likely have different summary values, depending on how many bits are reserved for the digest value 34. The probability of different databases having the same digest vales can be set very low by increasing the number of bits used.

Another exemplary embodiment may use the digest value 34 to select from a set of Virtual Local Area Network ("VLAN") identifiers. The data packet is encapsulated according to IEEE Standard 802.1Q, using the corresponding VLAN identifier in the VLAN Identifier ("VID") field of the VLAN tag. Thus, the VID indirectly encodes the topology instance at the time the data packet was originally launched. When there is any change in topology, all of the forwarding state information is immediately deleted and new forwarding state information is produced that includes the VID that corresponds to the new topology. When an intermediate node forwards a packet that was generated based on the same topology instance, it will have the same digest value, hence the same VID as the node that originally forwarded the packet. Any difference in topology between the sending node and the forwarding node results in different VIDs and the packet will most likely be dropped. For example, assuming that there are 100 possible VIDs, the probability that the new VID corresponding to a new topology change is different from the old VID is 99/100. Looping probability is controllable asymptotically to 0% by adding more VIDs or more bits to the digest if directly encoded.

Ideally, the present invention could account for an infinite sequence of topology configurations and then encode the data packets with the proper topology instance. This approach would result in absolutely perfect packet to topology correlation and no possibility of deviation from any path other than the shortest route. Because such constraints are impractical or impossible to implement, the present solution simply replaces "infinity" with a smaller amount of bits to obtain an adjustable probability instead of a hard-fast guarantee of freedom from looping.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for routing a data packet in a communication network, the method comprising:
    analyzing a current routing topology of the communication network;
    determining a first digest value representing the current routing topology;
    comparing the first digest value to a second digest value representing the routing topology at a previous time;
    encapsulating the first digest value in the data packet; and
    forwarding the data packet according to the current routing topology in response to the first digest value and the second digest value being the same.

2. The method of claim 1, wherein the first digest value is based on a cost associated with traversing each link.

3. The method of claim 2, wherein the first digest value is determined by applying a mathematical function to at least one of the node identifiers and the link identifiers and applying a modulo to the resulting value.

4. The method of claim 2 wherein the first digest value is mapped to a VLAN identifier field of an Ethernet header.

5. The method of claim 4, wherein the first digest value is included in a VLAN identifier field of an Ethernet header.

6. The method of claim 2, wherein the first digest value is determined by applying an XOR function to link-specific data.

7. A method for routing a data packets in a communication network, the method comprising:
    receiving a data packet for re-transmission, the data packet including a first digest value summarizing a routing topology of the communication network at a time the data packet originated;
    analyzing a current routing topology of the communication network;
    determining a second digest value representing the current routing topology;
    comparing the first digest value to the second digest value; and
    responsive to determining that the first digest value and the second digest value are the same, forwarding the data packet.

8. The method of claim 7, wherein the first digest value is computed based on an exchange of one of a BGP protocol message, an OSPF protocol message and an IS-IS protocol message.

9. The method of claim 7, further comprising, responsive to determining that the first digest value and the second digest value are different, discarding the data packet.

10. The method of claim 9, wherein the first digest value and the second digest value are determined considering at least one of node identifiers, link identifiers, and costs associated with traversing each link.

11. The method of claim 10, wherein the first digest value and the second digest value are formed using a hash function.

12. The method of claim 10, wherein the first digest value is encapsulated within the data packet.

13. The method of claim 10, wherein the first digest value and the second digest value are determined by adding at least one of the node identifiers and the link identifiers and applying a modulo to the resulting sum.

14. The method of claim 9, wherein the first digest value is mapped to a VLAN identifier field of an Ethernet header.

15. The method of claim 14, wherein the first digest value is included in a VLAN identifier field of an Ethernet header.

16. The method of claim 9, wherein the first digest value and the second digest value are determined by applying an XOR function to link-specific data.

17. An apparatus for routing data packets in a communication network, the apparatus comprising:
    a controller, the controller operable to:
        receive a first digest value representing a routing topology at a first time;
        analyze a current routing topology of the communication network at a second time;
        determine a second digest value representing the current routing topology at the second time
        compare the first digest value to the second digest value; and
        responsive to determining that the first digest value and the second digest value are different, discard the data packet; and
    a communication interface communicatively coupled to the controller, the communication interface operable to forward the data packet according to the routing topology.

18. The apparatus of claim 17, wherein responsive to determining that the first digest value and the second digest value are the same, the communication interface is further operable to forward the data packet.

* * * * *